(12) United States Patent
Tabuchi et al.

(10) Patent No.: US 6,813,683 B2
(45) Date of Patent: Nov. 2, 2004

(54) METHOD AND APPARATUS FOR COPYING DATA FROM A MAIN SITE TO A REMOTE SITE

(75) Inventors: Hideo Tabuchi, Odawara (JP); Akinobu Shimada, Chigasaki (JP); Masafumi Nozawa, Odawara (JP); Toshio Nakano, Chigasaki (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 10/424,495

(22) Filed: Apr. 25, 2003

(65) Prior Publication Data

US 2003/0196053 A1 Oct. 16, 2003

Related U.S. Application Data

(63) Continuation of application No. 09/526,948, filed on Mar. 16, 2000.

(51) Int. Cl.[7] .............................................. G06F 13/00
(52) U.S. Cl. ............................ 711/112; 711/4; 711/111; 711/161; 711/162
(58) Field of Search ............................ 711/4, 111, 112, 711/161, 162

(56) References Cited

U.S. PATENT DOCUMENTS

| | | | |
|---|---|---|---|
| 5,446,871 A | | 8/1995 | Shomler et al. |
| 5,544,347 A | | 8/1996 | Yanai et al. |
| 5,592,618 A | * | 1/1997 | Micka et al. .................. 714/54 |
| 5,615,329 A | * | 3/1997 | Kern et al. ..................... 714/6 |
| 5,720,029 A | * | 2/1998 | Kern et al. ................... 714/20 |
| 5,742,792 A | | 4/1998 | Yanai et al. |
| 6,539,462 B1 | * | 3/2003 | Mikkelsen et al. ......... 711/162 |
| 2003/0782526 | * | 9/2003 | Mikkelsen et al. ......... 711/162 |

* cited by examiner

*Primary Examiner*—Reba I. Elmore
(74) *Attorney, Agent, or Firm*—Townsend and Townsend and Crew LLP

(57) ABSTRACT

A disk subsystem assures the sequence and the coherence of data updating with two or more disk subsystems is provided with an asynchronous remote copy function. A main center 9 includes a computer system having the configuration of slave subsystems 3-2 to 3-n connected with a master disk subsystem 3-1. It secures the coherence between data at the main center 9 and the remote center 10 at the temporary suspension by repeating temporary suspension and release of the temporary suspension of the remote copy by the master subsystem 3-1 at predetermined opportunities. It also repeats temporary suspension and release of the temporary suspension of the remote copy by slave subsystems 3-2 to 3-n connected to it.

23 Claims, 4 Drawing Sheets

METHOD AND APPARATUS FOR COPYING DATA FROM A MAIN SITE TO A REMOTE SITE

BACKGROUND OF THE INVENTION

This invention relates to external storage units which store data for a computer system, as well as to an integrated system of such external storage units, The invention also relates to remote copy technology to duplicate data among external storage units without need of a host computer connecting external storage unit groups located at distant places with other external storage unit groups. A group of storage units (subsystem) includes a controller that exchanges information with a host unit and a storage unit that is integrated with a disk drive for storing data.

To provide reliable backup of data in a natural disaster such as an earthquake, the distance between a main center and remote centers is typically from 100 km to several hundreds kilometers. For this purpose, several external storage systems provided with a remote copy function that duplicate and store the data among subsystems at a main center and a remote center are used. Such remote copy functions can be separated into two categories—a synchronous type and an asynchronous type.

A synchronous remote copy procedure is one that when a data update (write) instruction is issued from a host computer at the main center to a subsystem and the object of the instruction is a remote copy function, the completion of update processing is reported to the host unit at the main center after the data update (writing) is completed at the remote subsystem. In this case, there is a delay time (transmission time etc.) corresponding to the geographical distance between the main center and the remote center, and the delay can be influenced by the performance of data transmission lines between the main center and the remote center.

An asynchronous remote copy operation is a processing procedure that when a data update instruction is issued from the host unit at the main center to its subsystem and the object of the instruction the remote copy function, the completion of update processing is reported to the host unit immediately upon completion of update processing of the subsystem of the main center, with the update (reflection) processing at the remote center executed asynchronously with the processing at the main center. Therefore, because the data is updated within the time required for the processing inside the main center, the processing does not require transmission time caused by sending the data to the remote center.

With the asynchronous processes, the contents of the subsystem at the remote center will not always agree with the contents at the main center. Therefore, if the main center loses functionality, for example, due to a natural disaster, the data not already saved at the remote center will be lost. The access performance of the subsystems at the main center, however, can be maintained at a similar level to the access performance of subsystems which do not execute the remote copy function. Such prior art has had following problems:

"Maintenance of coherence." In a remote copy operation, the subsystem at the remote center is connected with the subsystem at the main center by an independent communication link. When a remote copy is executed among the plural subsystems at the main center and the plural subsystems of remote centers, the configuration consists of two or more sets of subsystems connected by independent communication links.

In this configuration, a copy to the remote center is executed for each communication link; therefore, the time of data update at each subsystem is different. If the main center ceases operating, it is not clear which subsystem has data corresponding to the timing of the data are copied to the remote center. If a time stamp is not attached to each data, the coherence between the main center and the remote center will not be maintained.

Thus, in executing backup processing at the main center with plural subsystems at the remote center, there is maintenance of coherency (maintaining of the updating sequence) of data among the plural subsystems. Here, "sequence" means not only the sequence of data, but also the coherent "state" in the update in data of each subsystem at the remote side. In an asynchronous remote copy, the reflection of update data to the remote center is delayed from update processing of data at the main center. The sequence, however, of the update of the data must be in accordance with the sequence of the update of the data at the main center. Or looking at intervals, the sequence of data update processing generated at the main center and the sequence of the data update processing at the remote center must be coherent.

Generally, a database system comprises a database main body, and various kinds of log information and control information, and these are mutually related. In a data update, the log information and control information added to the database main body are updated to maintain coherence of the system. Therefore, if the sequence of the data update is scrambled, the coherence of these data that related to the update sequence will also be scrambled. This can cause the entire database to be compromised.

"Intervention of host unit." In an asynchronous remote copy in the general environment where the main center and the remote center are provided with two or more subsystems, generally when a host unit provides updated data to subsystems information related to the sequence of data update, for example, a time stamp, is added to the data. Based on such information, the processing to update the data is executed at the subsystems at the remote. For example, the remote copy disclosed by U.S. Pat. No. 5,446,871 describes a remote copy function with the intervention of a host system.

In the art disclosed by U.S. Pat. No. 5,446,871, the issue and transfer of the information for a data update sequence, and the processing to reflect the updated data are realized by cooperation of the operating system of the host unit and the disk subsystems on the side of the main center, and the data mover software of the host unit and the disk subsystems on the side of remote center.

SUMMARY OF THE INVENTION

With a prior art asynchronous type remote copy function the sequence of data update between the main center and the remote center can be assured. With the prior art, however, special software in the host unit and the subsystem are required, and the cooperation of each is necessary. For this, special dedicated software is required and difficult development, set up, inspection of the software, and review of system design with associated CPU load results. Therefore, considerable time and expense are required to introduce this function.

To provide an asynchronous remote copy function using only the functionality of the subsystems, the coherency of the sequence of data update must be maintained using only the subsystems. There is a problem that when the data that require the coherence of the sequence of data update are distributed to two or more subsystems, there is no means for maintaining the coherence of the sequence of data update among two or more subsystems. Moreover, it is desirable to prevent increased overhead caused by processing inside subsystems to maintain the sequence of data update.

The present invention provides an asynchronous type remote copy function that assures data coherence using the function of the subsystems, is easier to introduce and does not significantly deteriorate performance at the main center, and does not introduce new software to the host unit. The subsystems of a main center and a distant remote center are connected each other. When there are two or more subsystems, one of the subsystems (hereafter a master subsystem) is connected with all of other subsystems (hereafter a slave subsystem) at the main center.

A master subsystem at the main center temporarily suspends the remote copy and releases the temporary suspension of the remote copy. When a user sets these characteristics in the master subsystem in advance, the operation can be executed at any time during the execution of remote copy. When the subsystem at the main center receives data for update from the host unit, the subsystem starts the storage of the data in the subsystem.

Then, the master subsystem determines if the remote copy of the subsystem is temporarily suspended. If not, the data will be the object of transfer to the remote center. A slave subsystem confirms the state of the master subsystem by the control bits (explained later) when the slave subsystem receives update data from the host unit. Only when it is confirmed that the master subsystem is not in temporary suspension of the remote copy, is update data transferred to the remote center.

When the slave subsystem confirms the state of the master subsystem and detects that the master subsystem has temporarily suspended the remote copy, the slave subsystem temporarily suspends the remote copy. In the state of temporary suspension, the data transfer to the remote center is stopped, regardless of the master subsystem or the slave subsystem. Only the main center executes the data update processing, and the data update information is controlled and stored inside each subsystem. After the master subsystem releases temporary suspension of the remote copy, both the master subsystem and the slave subsystem restart the data transfer to the remote center. In this case, the updated data at the main center during temporary suspension of the remote copy is also the object of data transfer. Thus, duplication of data between the volumes of each subsystem at the main center and the remote center is executed by the asynchronous type remote copy.

DESCRIPTION OF THE SPECIFIC EMBODIMENTS

An example of a preferred embodiment of the present invention applied to a computer system is described below.

Figure 1:
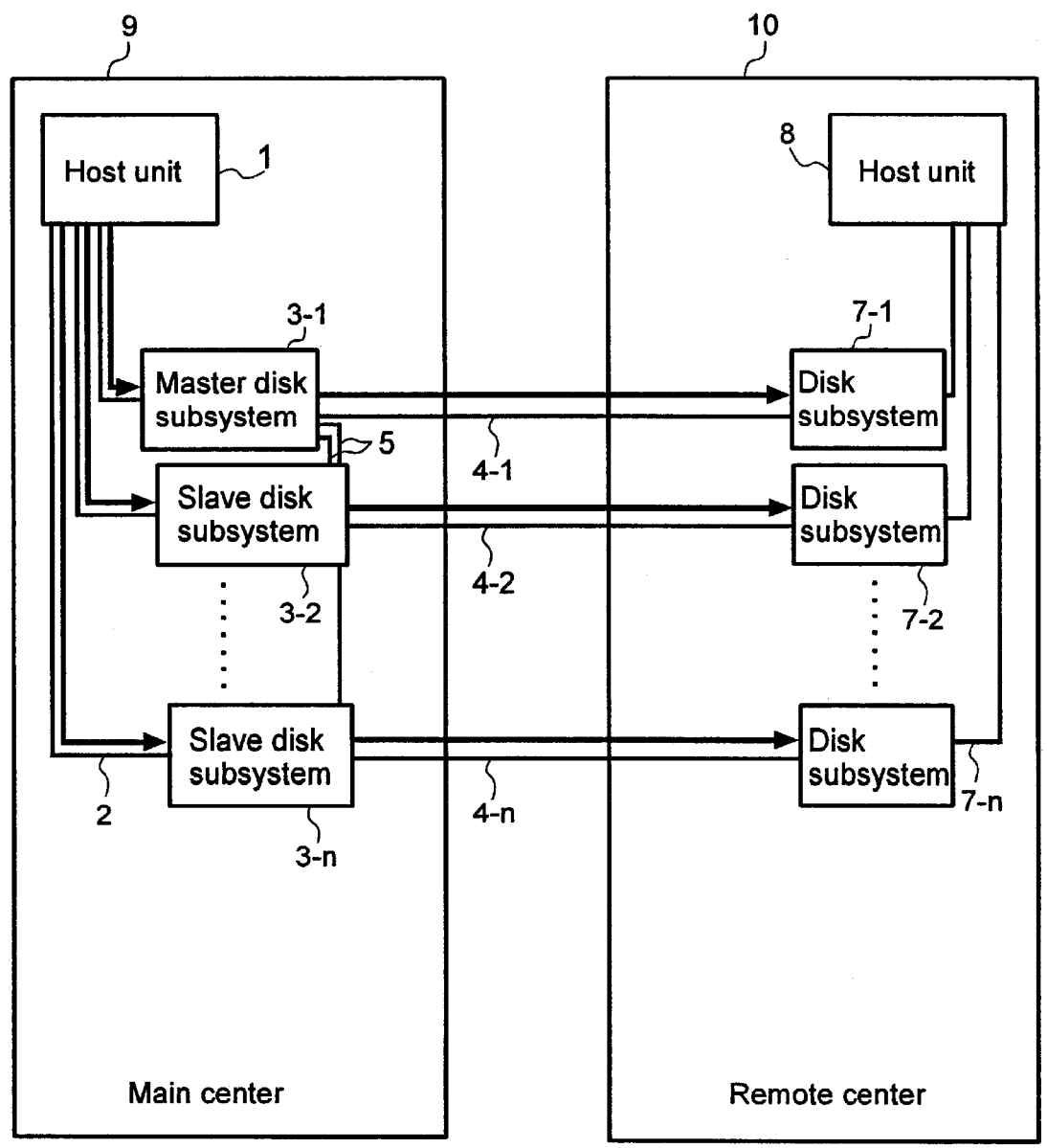
FIG. 1 is a diagram that illustrates the configuration of a remote copy system of a preferred embodiment of the present invention.

FIG. 1 is an example of configuration of the application of the present invention for duplicating information (data) between an arbitrary pair of centers at two or more data centers equipped with computer systems.

Figure 4:
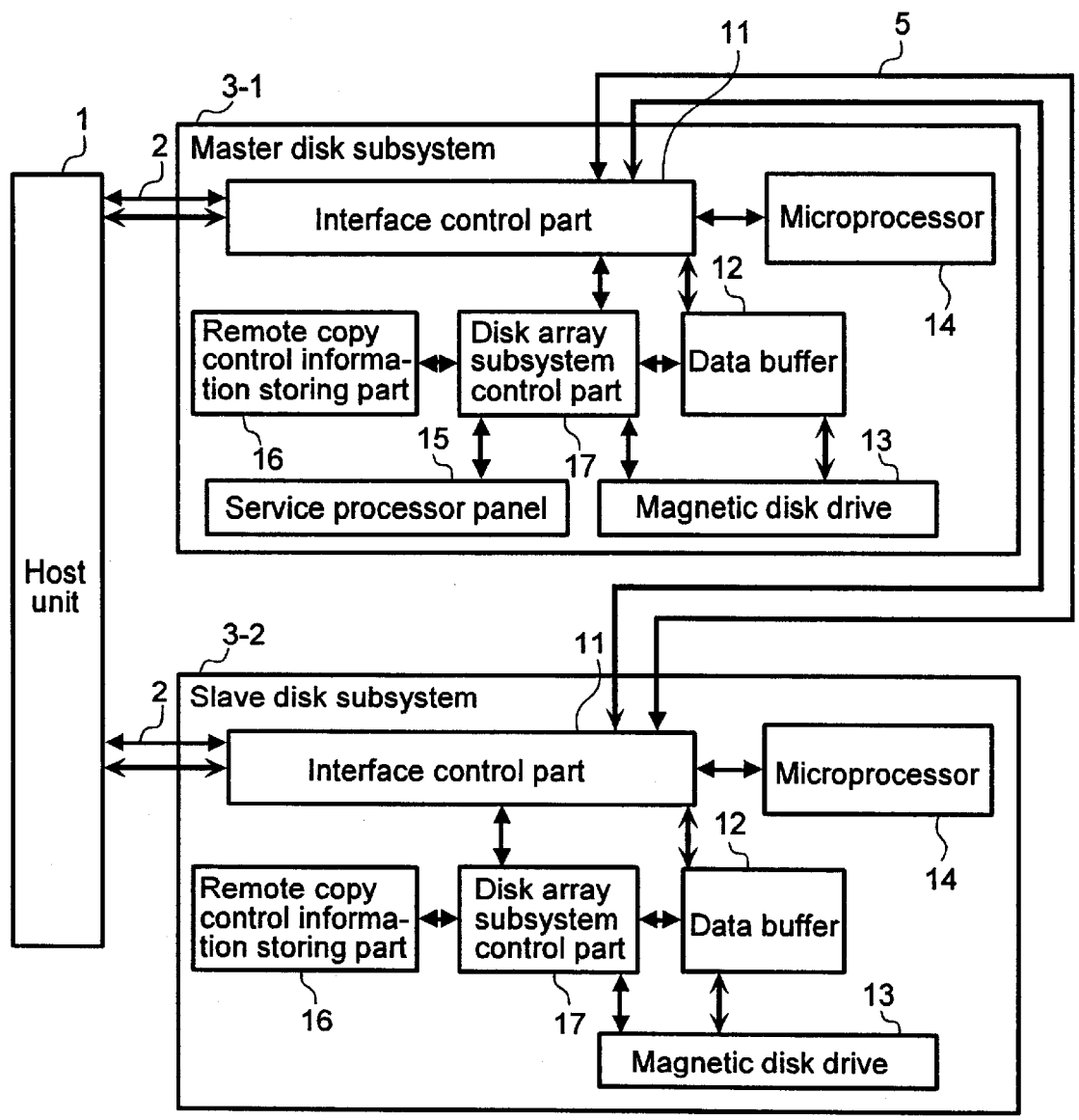
FIG. 4 is a diagram that illustrates the configuration of a main disk subsystem and a slave disk subsystem of a main center.

Connecting one or more units of disk subsystems 3 on the side of a main center 9 with one or more units of disk subsystems 7 on the side of a remote center 10 without the intervention of a host computer 1 and 8, a remote copy system that duplicates data between the centers is provided. An example of a connection of disk subsystems operating without the intervention of host unit, for example, is an SAN (Storage Area Network). FIG. 4 shows an example of the configuration of the disk subsystem 3 at the main center 9.

In the main center 9 of FIG. 1, a host unit 1, equipped with a central processing unit (CPU), that executes data processing is connected with a disk subsystem 3-1 (a master subsystem) and disk subsystems 3-2 . . . 3-n (slave subsystems) through an interface cable 2 that provides a transmission path.

The disk subsystems 3-1, 3-2, . . . 3-n comprise an interface control part 11 that exchanges data with the host unit 1, a buffer 12 that stores data that is referred to or updated by the host unit 1, a remote copy control information storing part 16 that stores information related to the address of updated data during the remote copy is temporarily suspended, a magnetic disk drive 13 that records the data, a microprocessor 14 that controls these data exchanges, and a disk array subsystem control part 17 that controls each of these elements.

In addition to the components described above, the master disk subsystem 3-1 is provided with a service processor panel 15 for a user to control the remote copy. The remote copy control information storing part 16 stores control bits that indicate the state of the current remote copy state from the control information set with the service processor panel 15. Adding to the information related to the address of the updated data during the remote copy is temporarily suspended.

The master disk subsystem 3-1 is connected with a disk subsystem 7-1 of a remote center 10 through an interface cable 4-1. The slave disk subsystem 3-2 is connected with a disk subsystem 7-2 of a remote center through an interface cable 4-2 and the slave disk subsystem 3-n is connected with a disk subsystem 7-n of the remote center through an interface cable 4-n similarly. The interface cables 4-1, 4-2, . . . 4-n can be general communication lines using a network connection unit. In this embodiment, these are described as interface cables 4-1, 4-2 . . . 4-n.

When there are two or more disk subsystems 3, the disk subsystem 3-1 is connected with a disk subsystems 3-2, . . . 3-n (one other than disk subsystem 3-1) that stores the data that are the object of the remote copy inside a main center 9 through the interface cable 5. Thus, on the side at the main center 9, the disk subsystem 3 that stores the data that is the object of the remote copy comprises a master disk subsystem 3-1 and other slave disk subsystems 3-2, . . . 3-n connected by the interface cable 5.

When the host unit 1 issues data write request to the master disk subsystem 3-1, the master disk subsystem 3-1 writes the corresponding data synchronously in the data buffer 12 of its own subsystem and instructs the data to be written to the disk subsystem 7-1, located at a distant place, asynchronously of the writing of data in the data buffer 12. Corresponding data written in the data buffer 12 of its own subsystem is recorded in the magnetic disk drive 13 synchronously or asynchronously.

Because the remote copy method writes data to the distant place asynchronously, there is a mode that the disk subsystem 3 at the main center 9 transmits the update data to the disk subsystem 7 of the remote center 10, to which the subsystem is connected, according to the sequence of the update of the volume inside the own subsystem. The disk subsystem 7 in the remote center 10 stores the updated data in the volume inside own subsystem according to the sequence of the receipt. There is also a mode that the main center 9 transmits the data that is the object of transfer by a lot at the opportunity optimally scheduled by the disk subsystem 3, not depending on the sequence of the update of the volumes in the own subsystem, and the disk subsystem 7 of the remote center 10 reflects the updated data to the volumes inside its own subsystem regardless of the sequence of the receipt.

When the host unit 1 issues a data write request to the disk subsystems 3-2, . . . 3-n, the slave disk subsystems 3-2, . . . 3-n write the corresponding data synchronously in the data buffers 12 inside their own subsystems and then refer to the state of the remote copy control information storing part 16 of the master disk subsystem 3-1. The slave disk subsystem judges whether to instruct the data write to the disk subsystem 7-2, . . . 7-n asynchronously of the writing of data in the data buffer 12 inside its own subsystem or to store the information regarding to the storing position of the update data in the remote copy control information storing part 16 inside its own subsystem depending on the state of the remote copy. The disk subsystems 7-1, 7-2, . . . 7-n are connected with the disk subsystems 3-1, 3-2, . . . 3-n through the interface cable 4 and store the data received from the disk subsystems 3-1, 3-2, . . . 3n in the data buffers 12 inside their own subsystems. That is, it shows the system configuration that when host unit 1 issues write data instruction to one or more of the disk subsystems 3-1, 3-2, . . . 3-n, the same data are stored in one or more of the disk subsystems 7-1, 7-2, . . . 7-n in the remote center 10 depending on the state of the disk subsystem 3-1. Arrows on FIG. 1 show the flow of the data for writes instructed by the host unit 1.

Because the master disk subsystem 3-1 has control bits that indicate the state of the remote copy inside the remote copy control information storing part 16, a system operator can suspend the remote copy state temporarily by altering the control bits at a predetermined opportunity or at any time by instruction of the system operator. When the remote copy is temporarily suspended, the disk subsystems 3-1, 3-2, . . . 3-n store the update data in the data buffer 12 of their own disk subsystems, retain the information of the address of the update data regarding to the write instruction received after the start of the temporary suspension of the remote copy in the remote copy control information storing part 16, and do not issue, but suspend the write instruction of the update data to the disk subsystems 7-1, 7-2, . . . 7-n.

With the present invention, therefore, the data on the side at the main center 9 at the moment of the temporary suspension of the remote copy reside in all subsystems on the side of the remote center 10. That is, the coherence between the data on the side at the main center 9 and the data on the side of the remote center 10 at the time of temporary suspension can be secured. Therefore, the necessity of adding time stamps to the data for securing coherence is eliminated and the remote copy is realized without the intervention of a host unit, even in an open system where time information is not attached from a host unit. The disk subsystems 3-1, 3-2, . . . 3-n can release the temporary suspension of the remote copy based on an instruction sent to the master disk subsystem 3-1 by the system operator or an instruction by the system operator at any time.

When the temporary suspension of the remote copy is released, the disk subsystems 3-1, 3-2, . . . 3-n issue the write instruction of the data that is updated during the temporary suspension to the disk subsystems 7-1, 7-2, . . . 7-n. If the data write request is issued from the host unit 1 to the disk subsystems 3-1, 3-2, . . . 3-n, the disk subsystem 3-1, 3-2, . . . 3-n write the corresponding data synchronously to the data buffer 12 inside their own subsystem, and further, instruct the data write to the disk subsystems 7-1, 7-2, . . . 7-n asynchronously of the data write to the internal data buffer 12.

With such a configuration, the same data are held within both the volumes of the disk subsystem 3 that is the object of remote copy inside the main center 9 and the volumes of the disk subsystem 7 inside the remote center 10 (if the delay of the update timing can be ignored). During the temporary suspension of the remote copy state with the master subsystem 3-1, the state of the data of each disk subsystem 3 at the main center 9 at the time the master subsystem 3-1 is temporarily suspended, that is, the state of the data secured with coherence at the corresponding time point, are assured and sustained by each disk subsystem 7 of the remote center 10.

Temporary suspension of remote copy or release of the temporary suspension of remote copy can be set at the unit of a volume pair. If two or more volume pairs are set as a volume group, changing the state with the unit of a volume group is enabled. By displaying temporary suspension or release of temporary suspension on a console of any subsystems 3 or 7 or the console of host unit 1 or 8, or on a monitor that is used for the control of these systems, a user can recognize whether remote copy is currently executed or not and with what unit the remote copy is executed. The user can arbitrarily set the interval between the temporary suspension and the release of the temporary suspension as long as the interval is not too short for new data copied to the side of remote center 10 at the release of the temporary suspension before all of the data before the temporary suspension can be copied to the side of the remote center 10, and the coherence between the data on the side at the main center 9 and on the side of the remote center 10 can be maintained.

As an example of copying time consider the storing of the data of the subsystem 7 at the moment of temporary suspension of the remote copy inside the remote center 10, a cycle of the execution of the remote copy for 30 minutes from the main center 9 to the remote center 10, the temporary suspension for 30 minutes and then, the execution of the remote copy for 30 minutes after the release of the temporary suspension. The time of the temporary suspension can be changed in conjunction with the copying time in case the copying time inside the remote center 10 is not 30 minutes, and the interval between the temporary suspension and the release of the temporary suspension can be set without retaining the copying time.

There can be a configuration that makes unnecessary the inquiry of the control bits from the slave disk subsystems to the master disk subsystem. This is achieved by distributing control bits that indicate the remote copy state and are stored in the remote copy control information storing part 16 inside the master disk subsystem 3-1 in advance from the master disk subsystem to the slave disk subsystems 3-2, . . . 3-n through the interface cable 5. In this case, the state control of the slave subsystem itself is stored in the remote copy control information storing part 16 of the slave disk subsystem, just as with the remote copy control information storing part 16 of the master disk subsystem.

The host unit 8 is a central processing unit that is connected with the disk subsystems 7-1, 7-2, . . . 7-n through the interface cable 6 at the remote center 10, and refers to and updates the disk subsystems 7-1, 7-2, . . . 7-n. The host unit 8 can execute the processing replacing the host unit 1 when the host unit 1 at the main center 9 cannot execute original function by hazard or failure. Further, the host unit 8 can execute the processing different from those of the host unit 1 in the main center 9 independent of the host unit 1 using the data stored in the disk subsystems 7-1, 7-2, . . . 7-n.

When the host unit 8 does not execute processing to the disk subsystems 7-1, 7-2, . . . 7.n, and when the host unit 8 is not provided with the replacing function of the host unit 1, the host unit 8 is not necessary. On the contrary, the main center 9 of FIG. 1 can function as the remote center and the remote center 10 as the main center, with the configuration that is provided with the host unit 8, of which disk subsystem 7-1 is connected with the other disk subsystems 7-2 to 7-n through the interface cable 5, as with the similar configuration with the master disk subsystem 3-1 at the main center 9.

Figure 2:
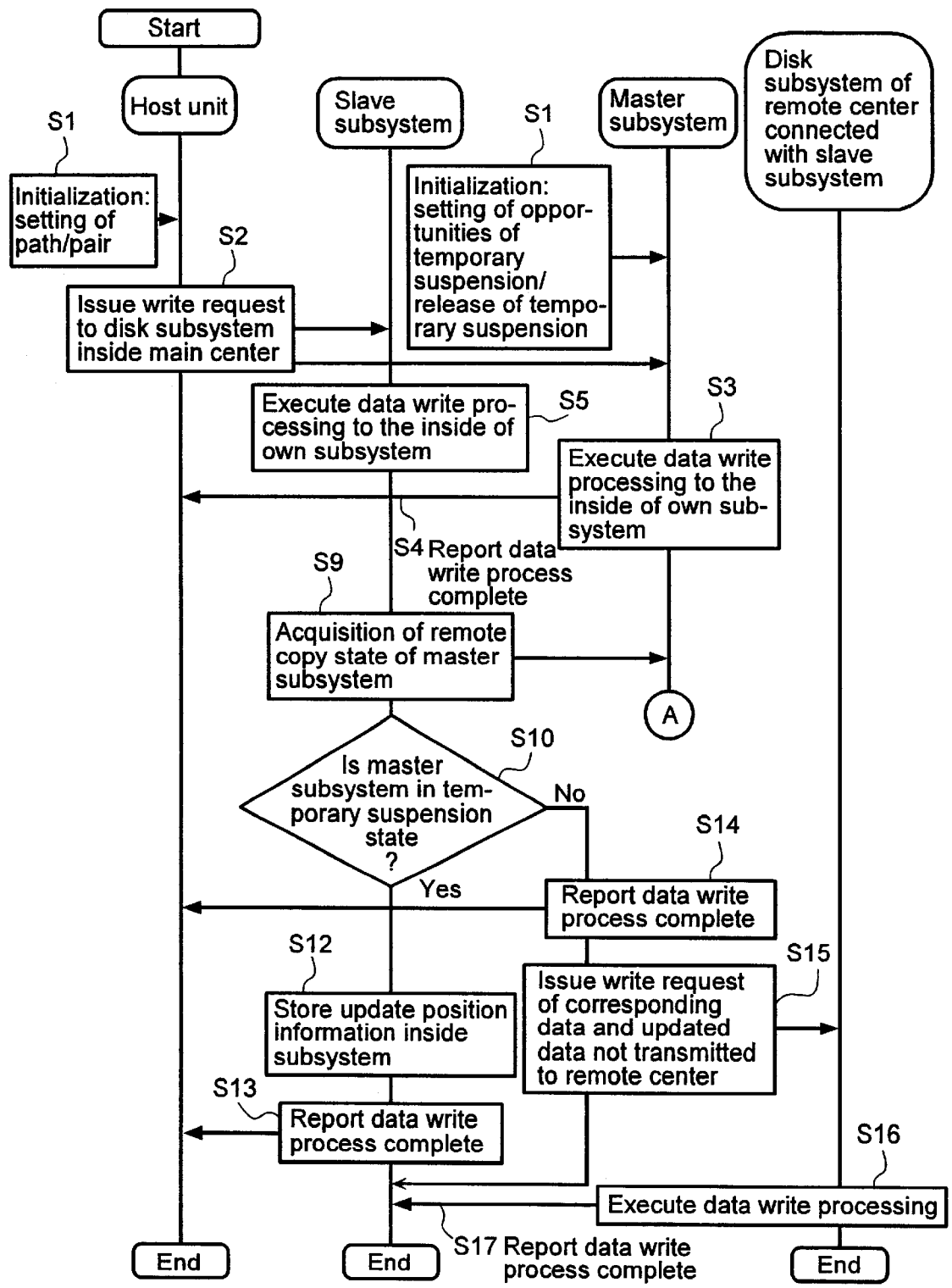
FIG. 2 is a flow chart that illustrates the operation of a remote copy system.

The method of data duplication and the operation is described using FIG. 2. In advance, an operator selects files and volumes, and the disk subsystem 3 that stores the data that are the object of duplication according to the need of the duplication, that is, the remote copy. The operator sets relations among the object files, the object volumes, the disk, subsystem 3 and the files, the volumes and the disk subsystem 7 that are to store the duplication of the selected data, and whether the full time maintenance of the coherence of the sequence of update is necessary, to the remote copy control information storing part 16 inside the master disk subsystem 3-1 from the host unit 1, a service processor 15. Generally, in many cases, setting of full time maintenance of the coherence of the sequence of updates is limited to the log files that are the history of updates of the database, but in this example, the set up of the full time maintenance of the sequence of update is not executed regardless file type.

In the master subsystem 3-1, the opportunity for temporary suspension of remote copy and the opportunity of releasing the temporary suspension of remote copy are set up. As the setting of the opportunities can be executed by the instruction from the host unit 1, the instruction from the host unit 1 can be scheduled in advance by the program of the host unit 1.

For a disk subsystem 3 that can be connected with or equipped with a dedicated console or the service processor 15 in the selection or setting as described above, the setting can be done through the console or the service processor 15 without the use of the host unit 1. In this example, the operator sets the periodical execution of the temporary suspension, and the release of the temporary suspension, of the remote copy beforehand at the master subsystem 3-i utilizing the retained time span inside the disk subsystem 3, without utilizing the host unit 1.

FIG. 2 is a flow chart that shows the execution of the selection and the setting from a dedicated console. The temporary suspension and the release of the temporary suspension of the remote copy are set up with a volume pair unit that is the object of the remote copy (step 1 in FIG. 2, etc.). Generally, all volume pairs that are the object of the remote copy are defined as a volume group and all volumes inside the volume group are set to have the same status.

In this example, all of the volumes of the disk subsystem 3 are the object of the remote copy. Therefore, the following describes the state of the remote copy with the unit of the disk subsystem 3, but not with the unit of a volume pair or a volume group. This detail is not described in this example, but the volume groups are set separately for a database and a log file. Therefore, there can be a definition that the opportunity for temporary suspension or the opportunity for release of the temporary suspension of the remote copy is not set up for the volume that store the log file.

Because of the method of setting files and volumes that are the object of the remote copy, there is a method of assigning specific addresses that implies volumes or disk subsystems, or a method of selecting an address within the arbitrary range of the addresses by the control program inside the disk subsystem. As the initial setting, the example of a path setting, a pair setting, and setting the temporary suspension and release of the temporary suspension are described.

When the host unit 1 issues a data write request (a write command, hereafter) to the disk subsystem 3-1 (step 2), the disk subsystem 3-1 executes data storage processing in the own disk subsystem based on the write command (step 3). After completing data write (storage) processing in the own disk subsystem, the disk subsystem 3-1 reports the completion of the write command to the host unit 1 (step 4).

When the host unit 1 issues write commands to the disk subsystems 3-2 . . . 3-n (step 2), the disk subsystems 3-2 . . . 3-n execute the data storage processing in their own disk subsystems based on the write commands (step 5). Here, the write command is the command for the data writing instruction and the transfer of the write data itself, and the user sets the disk subsystem to which the request is issued in advance to the host unit 1 (step 1).

Figure 3:
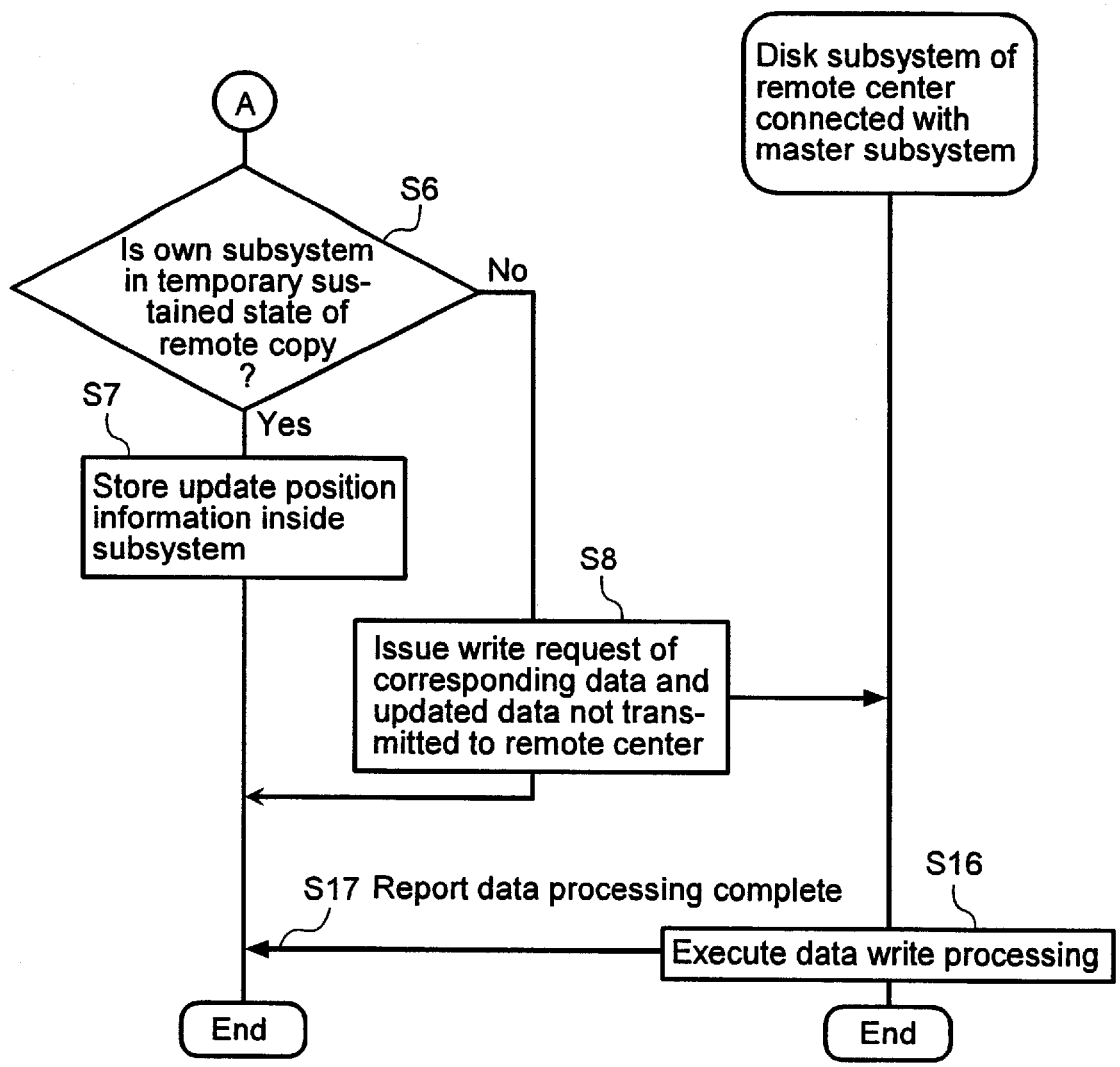
FIG. 3 is a flow chart that further illustrates the operation of a remote copy system.

When the disk subsystem 3-1 receives the write command, the disk subsystem 3-1 refers to the control bits inside the remote copy control information storage part 16 that indicate the state of the remote copy of the own subsystem and judges the state of the remote copy of the own subsystem (step 6 of FIG. 3). If its own subsystem is in the temporary suspension of the remote copy, the disk subsystem 3-1 does not transmit the update data to the disk subsystem 7-1 of the remote center 10, but retains the information regarding the storage position of the updated data inside its own subsystem (step 7). If its own subsystem is not in the temporary suspension of the remote copy, the disk subsystem 3-1 issues the write command to the disk subsystem 7-1 at the opportunity decided based on the processing capability of the own subsystem (step 8).

If its own subsystem retains the storage position information of the data that are updated during the temporary suspension state of the remote copy, the disk subsystem 3-1 judges the data of the corresponding position to be the object of transmission to the disk subsystem 7-1 of the remote center 10, issues a write command to write corresponding data, and after completion of processing the write command, erases the update position information. When the write command is received, the disk subsystems 3-2 . . . 3-n issue a command to the disk subsystem 3-1 through the interface cable 5 to inquire about the state of the disk subsystem 3-1, and by obtaining and referring to the control bits that indicate the state of the remote copy of the disk subsystem 3-1 (step 9), confirm whether the disk subsystem 3-1 is in temporary suspension state of the remote copy (step 10).

If the disk subsystem 3-1 is in the temporary suspension state of the remote copy, the disk subsystems 3-2 . . . 3-n retain the information related to the storage position of the updated data inside their own subsystems (step 12) and report the completion of the processing of the write command to the host unit 1 (step 13). If the disk subsystem 3-1 is not in the temporary suspension state, the disk subsystems 3-2 ... 3-n report the completion of the processing of the write command to the host unit 1 (step 14) and issue the write command to the disk subsystems 7-2 ... 7-n at the opportunity decided depending on the processing capability of the own subsystems. If the disk subsystems 3-2 ... 3-n retain the storage position information of the data updated during the temporary suspension state of the remote copy, the disk subsystems 3-2 ... 3-n judge the data of the corresponding position to be the object of transmission to the disk subsystems 7-2 ... 7-n of the remote center, issue a write command to write the corresponding data (step 15), and erase the update position information after the processing of the write command is completed.

That is, when the disk subsystem 3-1 is in the temporary suspension state of the remote copy, the other disk subsystems at the main center 9 that are connected with the disk subsystem 3-1 turn into the temporary suspension state of the remote copy due to the issuing of a write command from the host unit 1. When the disk subsystem 3-1 is not in the temporary suspension state of the remote copy, the other disk subsystems at the main center 9 that are connected with the disk subsystem 3-1 execute the remote copy due to the issuing of a write command from the host unit 1.

When the remote copy state of the disk subsystem 3-1 is changed, the disk subsystems 3-2 ... 3-n inform the disk subsystem 3-i (step 9', not shown) or as above mentioned, when the remote copy state of the disk subsystem 3-1 itself is changed, the disk subsystem 3-1 inform the disk subsystems 3-2 ... 3-n is possible, instead of the inquiring from the disk subsystems 3-2 ... 3-n to the disk subsystem 3-1 (step 9).

In case of the above mentioned settings, the disk subsystems 3-2 ... 3-n need to retain the state of the remote copy of themselves as with the disk subsystem 3-1. That is, when the disk subsystem 3-1 is in the temporary suspension state of the remote copy at step 10, the disk subsystems 3-2 ... 3-n change the state of remote copy of their own disk subsystems to the temporary suspension state of the remote copy (step 11, not shown). When the disk subsystem 3-1 is not in the temporary suspension state of the remote copy at step 10, the disk subsystems 3-2 ... 3-n change the state of the remote copy of the own disk subsystems to the released temporary suspension state of the remote copy (step 11', not shown). When the indication of the remote copy state of the disk subsystems is desired, the disk subsystems 3-2 ... 3-n inquire to the disk subsystem 3-1 as step 9, the state of the remote copy can be retained in the own disk subsystems and step 11 and step 11' can be arranged.

When the disk subsystem 7-1, 7-2, ... 7-n confirm the receipt of a write command issued from the disk subsystems 3-1, 3-2, ... 3-n, the disk subsystems 7-1, 7-2, ... 7-n execute the processing of the write command, that is, the data storage processing into the data buffer 12 inside the own subsystems (step 16). After completing processing of write command, that is the storage of the data in the data buffer 12 of its own subsystems, the disk subsystems 7-1, 7-2, ... 7-n report the completion of the processing of write command to the disk subsystems 3-1, 3-2, ... 3-n (step 17).

When the temporary suspension state is released, the disk subsystems 3-1, 3-2, ... 3-n issue the write instruction of the data of the corresponding position based on the storage position information of the data that are updated after the time the remote copy of its own subsystems were temporarily suspended to the disk subsystems 7-1, 7-2, ... 7-n. When the host unit 1 issues the write request of data to the disk subsystems 3-1, 3-2, ... 3-n, the disk subsystems 3-1, 3-2, ... 3-n, write the corresponding data to the data buffers 12 of their own subsystems synchronously with the write request, and instruct the data write to the disk subsystems 7-1, 7-2, ... 7-n that are remotely located, asynchronously of writing data to the data buffers 12 inside its own subsystems.

With the present invention, the data written by the host unit 1 is not only stored in the disk subsystems 3-1, 3-2, ... 3-n, but also copied and stored in the disk subsystems 7-1, 7-2, ... 7-n. The state of the data of the disk subsystems 3-1, 3-2, ... 3-n at the time point the disk subsystem 3-1 is in the temporary suspension state of the remote copy is generated by the disk subsystems 7-1, 7-2, ... 7-n on the side of the remote center 10. If data at the main center 9 is corrupted, the recovery work can be performed utilizing the data in the disk subsystems 7-1, 7-2, ... 7-n and the operation can be restarted.

On the side of the remote center 10, while the remote copy is in the temporary suspension state, a copy of the data of the disk subsystems 7-1, 7-2, ... 7-n is made and preserved using the volume copy function of the disk subsystem. By making the copy, if data at the main center 9 becomes corrupted while executing the remote copy and the coherence of the data is lost as the data are being written to the disk subsystems 7-1, 7-2, ... 7-n, the recovery work as the rerun of job based on the copy of the preserved corresponding data can be performed. All of these features are realized with the function of the disk subsystems and do not load the processing capability of the host unit.

As described, a remote copy system that assures the coherence of updated data within the range of user expectation and is easy to introduce without the need of introducing new software and without a change of function on the system side is realized. Furthermore, a high performance and easy to introduce emergency back up system can be provided by the improvement of the data transfer efficiency and by the reduction of the controlling overhead of the subsystem for keeping the coherence of the sequence of update as the data transfer between the main center and the remote center.

The preceding has been a description of the preferred embodiment of the invention. It will be appreciated that deviations and modifications can be made without departing from the scope of the invention, which is defined by the appended claims.

What is claimed is:

1. A system comprising:
   a master disk subsystem having a controller that communicates data with a host unit, a storage device that stores the data, and a control function that transfers and interrupts the transfer of the data to a first remote disk subsystem, at a predetermined interval;
   a slave disk subsystem having a controller that communicates data with the host unit, a storage device that stores the data, a transmission channel connected to the master disk subsystem, an inquiry detector that determines whether the master disk subsystem is in a data transfer state or in an interrupted data transfer state, the slave disk subsystem transferring the data to a second remote disk subsystem when the master disk subsystem is in the data transfer state;
   the first remote disk subsystem having a controller that receives data transferred from the master disk subsystem, and a storage device that stores the data; and
   the second remote disk subsystem having a controller that receives data transferred from the slave disk subsystem, and a storage device that stores the data.

2. A method of performing a remote copy to store data in a remote center from a main center having a master and a slave subsystems comprising:
  receiving data at the slave subsystem from a host unit;
  storing the data in a memory in the slave subsystem;
  deterring whether the master subsystem is in a state of transferring data to the remote center; and
  transferring the data from the slave subsystem to the remote center when the master subsystem is in the state of transferring data, and retaining information of a location where the data is stored in the slave subsystem when the master subsystem is not in the state of transferring data;
  wherein the slave subsystem transfers data to the remoter center depending on whether or not the master subsystem transfers data to the remote center.

3. An integrated system comprising:
  at least a master and a slave disk subsystem, each of which is provided with a control part that communicates data with a host unit and a storage part that stores the data, and wherein each subsystem transfers the data from the host unit to a remotely located disk subsystem; wherein
  the slave disk subsystem queries the master disk subsystem to determine whether the slave disk subsystem can transfer data to the remotely located disk subsystems.

4. An integrated system as in claim 3 wherein the slave disk subsystem determines whether the transfer executes based on whether data transfer from the master disk subsystem to the remotely located disk subsystems is temporarily suspended.

5. An integrated system as in claim 4 in which the master disk subsystem performs the temporary suspension of data transfer to the remotely located disk subsystems and the release of the temporary suspension in a periodic fashion.

6. An integrated system as in claim 3 in which data transfer between the master disk subsystem connected with the host unit and the remotely located disk subsystem is performed asynchronously.

7. An integrated system comprising a main disk subsystem group connected with a host unit and a remote disk subsystem group tat receives a data transfer from the main disk subsystem group, and in which one of the disk subsystems of the main disk subsystem group is a master subsystem, wherein the master subsystem contains information that controls whether the other subsystems in the main disk subsystem group transfer data from the main disk subsystem group to the remote disk subsystem group.

8. An integrated system as in claim 7 in which control of the data transfer is based on whether the master subsystem temporarily suspends the data transfer to the remote disk subsystem group.

9. An integrated an system as in claim 7 in which the main disk subsystem group is connected with the remote disk subsystem group through a storage area network.

10. An integrated subsystem as in claim 7 in which the data transfer between the main disk subsystem group and the remote disk subsystem group is performed asynchronously.

11. An integrated system as in claim 10 in which need for request of an update sequence assurance is determined by assigning a dedicated disk volume at time of an asynchronous data transfer.

12. A method of preserving coherence of data that is sent from a main center having a master subsystem and a slave subsystem to a remote center comprising:
  receiving data from the host unit;
  storing the data in at least one of the master subsystem and the slave subsystem; and
  transferring data to the remote center; wherein
  the slave subsystem queries the master subsystem whether the master subsystem is in a state to transfer data to the remote center prior to the slave subsystem transferring data to a remote center.

13. A method as claim in 2, when the master subsystem is not in the state of transferring data, transferring the data to the remote center after the master subsystem is in the state of transferring data.

14. A system comprising:
  a master disk system disposed at a primary site, having a controller that connects to a host unit and a plurality of storage devices to store data;
  a slave disk system disposed at the primary site, having a controller that connects to the host unit and a plurality of storage devices that stores the data;
  a first remote disk subsystem disposed in a secondary site, having a controller that receives data transferred from the master disk system and a plurality of storage devices that stores the data; and
  a second remote disk system disposed in the secondary site, having a controller that receives data transferred from the slave disk system and a plurality of storage devices that stores the data,
  the controller in the master disk system configured to alternate at a predetermined interval between a state of operation in which data received from the host is transferred to the first remote disk subsystem and a state of operation in which data received from the host is not transferred to the first remote disk subsystem,
  the controller in the slave disk system configured to transfer data received from the host depending on the state of operation of the master disk system.

15. The system of claim 14 further comprising a communication link between the master disk system and the slave disk system, the communication link being used by the slave disk system to determine the state of operation of the master disk system.

16. The system of claim 15 in which the slave disk system transfers the data to the second disk system when the master disk system is in a data transfer state.

17. The system of claim 16 in which to master disk system transfers the data to the first disk system when the master disk system is in the data transfer state.

18. The system of claim 15 in which the slave disk system interrupts the transfer of the data to the second disk system when the master disk system is in an interrupted data transfer state.

19. The system of claim 18 in which the master disk system interrupts the transfer of the data to first disk system when the master disk system is in the interrupted data transfer state.

20. The system of claim 14 in which the slave disk system transfers the data to the second disk system when the master disk system is in a data transfer state.

21. The system of claim 20 in which the master disk system transfers the data to the first disk system when the master disk system is in the data transfer state.

22. The system of claim 14 in which the slave disk system interrupts the transfer of the data to the second disk system when the master disk system is in an interrupted data transfer state.

23. The system of claim 22 in which the master disk system interrupts the transfer of the data to the first disk system when the master disk system is in the interrupted data transfer state.

* * * * *